United States Patent [19]

Cho et al.

[11] Patent Number: 4,652,290

[45] Date of Patent: Mar. 24, 1987

[54] METHOD FOR MAKING OPTICAL CHANNEL WAVEGUIDES AND PRODUCT MANUFACTURED THEREBY

[75] Inventors: Frederick Y. Cho, Scottsdale; Fred S. Hickernell, Phoenix; Fred V. Richard, Scottsdale, all of Ariz.

[73] Assignee: Motorola, Inc., Schaumburg, Ill.

[21] Appl. No.: 510,503

[22] Filed: Jul. 5, 1983

[51] Int. Cl.$^4$ .......................... C03C 17/00; G02B 6/10
[52] U.S. Cl. .......................................... 65/31; 65/60.2; 65/60.8; 350/96.12
[58] Field of Search ............... 65/3.11, 60.2, 60.53, 65/31, 60.80; 427/162; 156/653, 459.1; 350/96.12

[56] References Cited

U.S. PATENT DOCUMENTS

| 3,817,730 | 6/1974 | Uchida | 65/31 |
| 3,885,855 | 5/1975 | Gross | 65/3.11 |
| 4,343,890 | 8/1982 | Phillips et al. | 427/162 |
| 4,376,160 | 3/1983 | Evanchuk | 427/162 |

FOREIGN PATENT DOCUMENTS

| 44827 | 4/1977 | Japan | 65/31 |
| 604 | 1/1982 | Japan | 65/31 |
| 6813 | 1/1982 | Japan | 427/162 |

OTHER PUBLICATIONS

*Hack's Chem Dict.* p. 610, 4th edition 1972.
*Intro. to Ceramics,* by Kingery et al., 2nd edition, 1976, pp. 886–887.

*Primary Examiner*—S. Leon Bashore
*Assistant Examiner*—Michael K. Boyer
*Attorney, Agent, or Firm*—Eugene A. Parsons

[57] ABSTRACT

An optical channel waveguide is manufactured by forming an optical isolation pedestal or ridge on a substrate and coating the substrate and pedestal with an optical channel layer. The optical channel waveguide is that portion of the optical channel layer which overlies the pedestal. Cladding layers may be added overlying the optical channel film or the cladding function may be performed by air. The disclosed process requires no high temperature diffusion steps and is thus suitable for manufacturing optical channel waveguides integrated on a semiconductor substrate with semiconductor devices. In addition, the entire process for manufacturing the optical channel waveguide may be carried out during a single pumpdown of a vacuum system.

10 Claims, 4 Drawing Figures

METHOD FOR MAKING OPTICAL CHANNEL WAVEGUIDES AND PRODUCT MANUFACTURED THEREBY

FIELD OF THE INVENTION

The present invention relates, in general, to an improved method for making optical channel waveguides and to the waveguides manufactured by that method. More particularly, the invention relates to a method of making optical channel waveguides which can be performed during a single vacuum system pumpdown.

BACKGROUND OF THE INVENTION

Optical channel waveguides comprise a first material having a first index of refraction surrounded by cladding materials having lower indices of refraction. Optical energy propagates within the channel defined by the first material. One common method of manufacturing such waveguides is to deposit a strip of titanium or the like on a lithium niobate substrate and to expose the apparatus to a high temperature to cause the titanium to in-diffuse to form the channel. However, lithium niobate is not a suitable substrate for integrating semiconductor devices with the optical waveguide. Furthermore, any process which involves a high temperature in-diffusion step introduces the problem of the exposure of any devices which are integrated with the optical channel to the high temperature.

Another method of fabricating optical channel waveguides involves the preferential etching of silicon to form a V-groove into which a high index of refraction material is deposited. The masking, etching and deposition steps required for this process cannot be performed during a single pumpdown of the vacuum system. Thus, the problem of contamination of the various layers of the finished device is introduced.

SUMMARY OF THE INVENTION

Accordingly, it is an object of the present invention to provide an improved method for making optical channel waveguides.

It is a further object of the present invention to provide an improved method of making optical channel waveguides which does not involve high temperature, in-diffusion steps.

Yet a further object of the present invention is to provide an improved method for making optical channel waveguides on semiconductor substrates which can be performed entirely during a single pumpdown of a vacuum system.

A particular embodiment of the present invention comprises a method of making an optical channel waveguide comprising the steps of growing an oxide layer approximately two microns thick on a silicon substrate, applying photoresist and etch steps to define a pedestal or ridge of the silicon dioxide layer which is approximately eight microns wide and depositing a film of zinc oxide covering the substrate and the pedestal to a depth of 0.6 to 0.8 microns. That portion of the zinc oxide film which overlies the pedestal forms the optical channel waveguide. The index of refraction of the zinc oxide film is roughly 2.0. The index of the silicon dioxide pedestal is approximately 1.5 and the index of air is 1. In the preferred embodiment of the present invention, air is used as the cladding material overlying the optical channel. It is also possible to deposit other cladding media, such as graded-index films, over the optical channel film.

Since no etching steps are required subsequent to the deposition of the film defining the optical channel, the process may be carried out during a single pumpdown of the vacuum deposition system. Furthermore, no high temperature diffusion steps are required. These and other objects and advantages of the present invention will be apparent to one skilled in the art from the detailed description below taken together with the drawings.

DETAILED DESCRIPTION OF THE INVENTION

Figure 1:
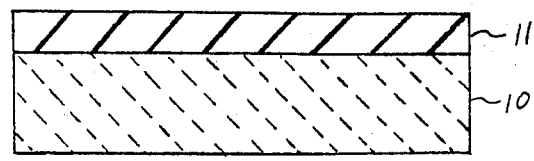
FIG. 1 is a cross-sectional view illustrating an initial stage in the process of the present invention.

FIG. 1 is a cross-sectional view depicting an initial stage in the making of an optical channel waveguide according to a particular embodiment of the present invention. This and all other sections are taken perpendicular to the primary direction of propagation in the optical channel. A substrate 10 is covered with an optical isolation layer 11. Substrate 10 may be any suitable substrate and, in particular, it may be a semiconductor substrate. As will be apparent from the description of the remainder of the process, no steps are required which would necessarily significantly alter the characteristics of any semiconductor devices which have been fabricated elsewhere in substrate 10. Optical isolation layer 11 has a relatively low index of refraction and is thick enough so that the evanescent field from the optical channel waveguide does not significantly penetrate through to substrate 20. In a particular embodiment of the present invention substrate 10 is silicon and optical isolation layer 11 is approximately two microns (20,000 angstroms) of thermally grown silicon dioxide. Silicon dioxide has an index of refraction of approximately 1.5. It is also possible to use a gallium arsenide substrate with a sputtered or otherwise deposited silicon dioxide optical isolation layer. While optical isolation layer 11 is shown covering all of substrate 10, this need only be true in the region of the eventual waveguide.

Figure 2:
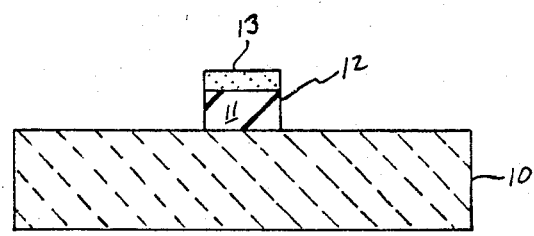
FIG. 2 is a cross-sectional view illustrating an intermediate stage in the process of the present invention.

Referring now to FIG. 2, a subsequent stage in the manufacture of the optical channel waveguide is depicted. A pedestal 12 of optical isolation layer 11 has been defined by means of a mask 13. The remainder of optical isolation layer 11 has been removed. In a particular embodiment of the present invention, mask 13 comprises a photoresist layer and the process includes the steps of: depositing the photoresist on optical isolation layer 11, exposing the photoresist to define mask 13, developing the photoresist to remove the unexposed portions, and etching the portions of optical isolation layer 11 which are not protected by mask 13. In addition, a subsequent step involves the removal of mask 13. In this particular embodiment of the invention, pedestal 12 is approximately eight microns (80,000 angstroms) wide.

Figure 3:
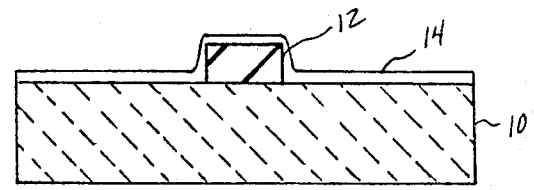
FIG. 3 is a cross-sectional view illustrating the final stage in the proceledged.

Referring now to FIG. 3, a final stage of the process is depicted. Substrate 10 and pedestal 12 have been covered by an optical channel layer 14. As is described below with reference to FIG. 4, that portion of optical channel layer 14 which overlies pedestal 12 forms the optical channel waveguide. In a particular embodiment of the present invention, optical channel layer 14 comprises an optical quality layer of zinc oxide which is approximately 6,000 to 8,000 angstroms thick. The zinc oxide film is applied at normal incidence by DC triode sputtering. The pressure in the deposition chamber is approximately three microns of mercury and the atmosphere composition is ten percent oxygen and ninety percent argon. The film is deposited at a rate of approximately three angstroms per second. The substrate temperature during deposition is 300 degrees Centigrade. Depending on the particular mode of energy propagation, the index of refraction of the zinc oxide film varies from 1.98 to 2.0.

The final step in making an optical channel waveguide according to the principles of the present invention involves providing a cladding layer overlying optical channel layer 14. The cladding layer must have an index of refraction lower than that of optical channel layer 14. Since the index of refraction of air is approximately 1, it is possible to provide the necessary cladding layer by simply exposing optical channel layer 14 to the air. As will be apparent to one skilled in the art, it is also possible to deposit various types of materials on optical channel layer 14 to provide the cladding function.

Figure 4:
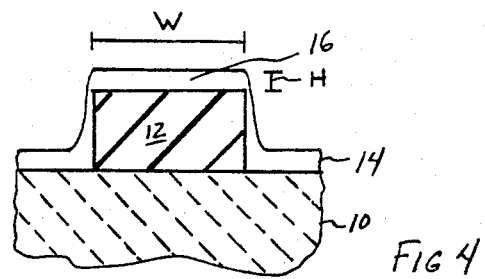
FIG. 4 is a cross-sectional view on an enlarged scale showing an optical channel waveguide according to the principles of the present invention.

Referring now to FIG. 4, a cross-sectional view of an optical channel waveguide according to the principles of the present invention is shown. Substrate 10 is overlaid by pedestal 12 and optical channel layer 14. Optical channel waveguide 16 is defined as that portion of optical channel layer 14 which overlies pedestal 12. Optical channel waveguide 16 has a width W and a height H. As is familiar in the art, these dimensions together with the difference in the index of refraction between pedestal 12, optical channel layer 14 and the cladding layer determine which modes of energy propagation will be supported by waveguide 16. The primary direction of propagation of energy in waveguide 16 is perpendicular to the cross section of FIG. 4. The variation in the indices of refraction and the dimensions of waveguide 16 also determine the minimum radii of any bends in waveguide 16. The particular embodiment of the invention disclosed herein comprises a multi-mode waveguide which has a relatively large index of refraction variation and can therefore support relatively short radius bends. As is apparent, single mode optical channel waveguides having relatively small variation in the indices of refraction can also be readily achieved by the process of the present invention.

While the present invention has been particularly shown and described with reference to a particular embodiment thereof, various modifications and changes may be made without departing from the spirit and scope of the present invention.

We claim:

1. A method of making an optical channel waveguide comprising the steps of:
    forming a pedestal on a substrate;
    depositing an optical channel layer at least on said pedestal, said optical channel layer having an index of refraction greater than said pedestal; and
    providing a cladding layer overlying said optical channel layer, said cladding layer having an index of refraction lower than said optical channel layer.

2. A method according to claim 1 wherein said step of forming a pedestal further comprises the steps of:
    forming an optical isolation layer on a semiconductor substrate;
    masking a pedestal portion of said optical isolation layer; and
    removing unmasked portions of said optical isolation layer.

3. A method according to claim 1 wherein said step of providing a cladding layer comprises the step of:
    exposing said optical channel layer to air.

4. A method according to claim 2 wherein said optical isolation layer comprises approximately two microns of silicon dioxide.

5. A method according to claim 1 wherein said step of depositing said channel layer further comprises the step of:
    depositing an optical quality zinc oxide film on said pedestal and said substrate.

6. A method according to claim 5 wherein said zinc oxide film is from 6,000 to 8,000 angstroms thick.

7. An optical channel waveguide comprising:
    a substrate;
    an optical isolation pedestal on said substrate;
    an optical channel film overlying said pedestal and said substrate, said optical channel film having an index of refraction greater than said optical isolation pedestal; and
    a cladding layer overlying said optical channel film, said cladding layer having an index of refraction lower than said optical channel film.

8. An optical channel waveguide according to claim 7 wherein:
    said substrate is a semiconductor material; and
    said optical isolation pedestal is silicon dioxide.

9. An optical channel waveguide according to claim 7 wherein:
    said optical channel film is zinc oxide.

10. An optical channel waveguide according to claim 7 wherein:
    said cladding layer is air.

* * * * *